US006611254B1

(12) United States Patent
Griffin et al.

(10) Patent No.: US 6,611,254 B1
(45) Date of Patent: *Aug. 26, 2003

(54) HAND-HELD ELECTRONIC DEVICE WITH A KEYBOARD OPTIMIZED FOR USE WITH THE THUMBS

(75) Inventors: Jason T. Griffin, Waterloo (CA); John A. Holmes, Waterloo (CA); Mihal Lazaridis, Waterloo (CA); Herb A. Little, Waterloo (CA); Harry R. Major, Waterloo (CA)

(73) Assignee: Research In Motion Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/634,774

(22) Filed: Aug. 9, 2000

Related U.S. Application Data

(60) Division of application No. 09/106,585, filed on Jun. 29, 1998, which is a continuation-in-part of application No. 29/089,942, filed on Jun. 26, 1998, now Pat. No. Des. 416,256.

(51) Int. Cl.⁷ .................................................. G09G 5/00
(52) U.S. Cl. ........................................ 345/169; 345/168
(58) Field of Search ............................. 345/156, 157, 345/169, 168, 901, 184; 341/22; 707/4, 526; 709/200, 201, 202, 203, 204, 205, 206, 231, 232; 455/3.01, 3.03, 3.02

(56) References Cited

U.S. PATENT DOCUMENTS

| D312,628 S | | 12/1990 | Yokoi et al. | |
|---|---|---|---|---|
| D313,401 S | | 1/1991 | Tanabe | |
| D313,413 S | | 1/1991 | Langton | |
| 5,410,141 A | | 4/1995 | Koenck et al. | |
| 5,426,449 A | * | 6/1995 | Danziger | 400/472 |
| D359,920 S | | 7/1995 | Sakamoto | |
| 5,457,454 A | * | 10/1995 | Sugano | 341/22 |
| 5,500,643 A | * | 3/1996 | Grant | 341/22 |
| 5,563,631 A | * | 10/1996 | Masunaga | 345/169 |
| 5,606,712 A | | 2/1997 | Hidaka | |
| 5,611,031 A | | 3/1997 | Hertzfeld et al. | |
| D381,021 S | | 7/1997 | Williams et al. | |
| D383,756 S | * | 9/1997 | Henderson et al. | D14/191 |
| D390,509 S | | 2/1998 | Antzinas et al. | |
| 5,818,437 A | | 10/1998 | Grover et al. | |
| 5,825,353 A | * | 10/1998 | Will | 345/184 |
| D402,572 S | | 12/1998 | Han | |
| 5,915,228 A | | 6/1999 | Kunihiro et al. | |
| 5,995,026 A | * | 11/1999 | Sellers | 341/34 |
| D420,351 S | | 2/2000 | Waldner | |
| 6,023,779 A | * | 2/2000 | Fullam et al. | 714/751 |
| 6,049,796 A | * | 4/2000 | Siitonen et al. | 707/3 |
| 6,052,070 A | | 4/2000 | Kivela et al. | |
| 6,091,956 A | * | 7/2000 | Hollenberg | 455/456 |
| 6,094,197 A | * | 7/2000 | Buxton et al. | 345/358 |
| 6,102,594 A | | 8/2000 | Strom | |
| 6,103,979 A | | 8/2000 | Motoyama et al. | |
| 6,107,997 A | * | 8/2000 | Ure | 345/173 |
| D432,511 S | | 10/2000 | Eckholm | |

(List continued on next page.)

FOREIGN PATENT DOCUMENTS

| EP | 0760291 | | 3/1997 | |
|---|---|---|---|---|
| EP | 1143327 A1 | * | 10/2001 | G06F/3/023 |
| WO | WO 99/37025 | * | 7/1999 | H03K/17/94 |
| WO | WO 00/30381 | * | 5/2000 | H04Q/7/22 |

Primary Examiner—Vijay Shankar
Assistant Examiner—Mansour M. Said
(74) Attorney, Agent, or Firm—Jones Day; Krishna K. Pathiyal, Esq.; Charles B. Meyer, Esq.

(57) ABSTRACT

A hand-held electronic device with a keyboard optimized for use with the thumbs is disclosed. In order to operate within the limited space available on a hand-held electronic device, the present invention optimizes the placement and shape of the keys, preferably using keys that are oval or oblong in shape, and that are placed at angles designed to facilitate thumb-typing. The angles at which keys on either side of the keyboard are placed is complimentary.

25 Claims, 4 Drawing Sheets

U.S. PATENT DOCUMENTS

| | | |
|---|---|---|
| D433,017 S | 10/2000 | Martinez |
| 6,148,261 A * | 11/2000 | Obradovich et al. ........ 701/208 |
| 6,157,323 A * | 12/2000 | Tso et al. ..................... 341/22 |
| D436,591 S | 1/2001 | Abston et al. |
| 6,212,412 B1 * | 4/2001 | Rogers et al. .............. 455/575 |
| D441,733 S | 5/2001 | Do et al. |
| 6,243,789 B1 * | 6/2001 | Hasbun et al. .............. 711/103 |
| D451,079 S | 11/2001 | Ali |
| D454,349 S | 3/2002 | Makidera et al. |
| D454,849 S | 3/2002 | Eckholm |
| 6,374,277 B2 * | 4/2002 | Vong et al. ................. 708/112 |
| D456,794 S | 5/2002 | Laverick et al. |
| D458,239 S | 6/2002 | Shim et al. |
| D459,327 S | 6/2002 | Ali |
| D460,068 S | 7/2002 | Lanzaro et al. |
| 6,459,968 B1 * | 10/2002 | Kochie ........................ 701/29 |

\* cited by examiner

US 6,611,254 B1

HAND-HELD ELECTRONIC DEVICE WITH A KEYBOARD OPTIMIZED FOR USE WITH THE THUMBS

This application is a Division of U.S. Ser. No. 09/106,585, entitled "Hand-Held Electronic Device With A Keyboard Optimized For Use With The Thumbs", filed Jun. 29, 1998, which is a continuation-In-Part of U.S. Design Application Ser. No. 29/089,942 entitled "Hand-Held Messaging Device With Keyboard", filed Jun. 26, 1998, U.S. Pat. Des. 416,256 and assigned to the assignee of the present invention.

BACKGROUND OF THE INVENTION

The present invention is directed toward the field of small, hand-held electronic devices such as personal data assistants (PDA's), personal information managers (PIM's), two-way pagers and the like. In particular, the system and method of the present invention provide the user of the hand-held device with the ability to input data with a minimal amount of key strokes and optimized for use substantially with the thumbs.

In a two-way paging system that provides two-way, full text messaging, there is a need to permit the user to initiate messages and to respond to messages in a timely fashion and with text entirely created by the user. In order to keep the form factor of the two-way pager small enough to be worn on the body of the user, such as with a belt clip, the input device needs to be small, have a minimal number of keys and optimized for use with a minimal number of key strokes. Prior art systems have attempted to address these needs by incorporating virtual keyboards or pen-based input systems for user inputs to the device, but such systems require the user to input data in an unfamiliar manner. Additionally, in a small hand-held messaging device, such as a two-way pager, these systems prove awkward to use.

In order to provide a hand-held electronic device that permits a user the opportunity to enter data into an address book, a calendar, a task list, an email message or a similar text file that requires user-generated data, the instant invention is directed to an input device that is oriented to be used substantially through use of the thumbs. This is accomplished first by providing a keyboard with a minimal number of keys, but with the keys representing the alphabet generally placed in the same order as they would appear on a standard keyboard, such as in a standard QWERTY or a DVORAK keyboard layout. The use of a keyboard layout that is familiar to the user enables the user to immediately use the device without having to hunt for the keys he or she wishes to use.

Although the layout is similar to a standard keyboard, the keys are placed at an orientation and in a particular shape that attempts to maximize the surface area of the thumb hitting the key and to provide the user with a comfortable position of the hands for data input. Also, the orientation encourages input by the thumbs, which the inventors of the instant invention have discovered to be faster and more accurate in small hand-held electronic devices than touch-typing or "hunting and pecking" typing.

An additional feature of the invention is the use of an additional input means for control of functions that might otherwise be controlled by a keyboard that included function keys. To encourage data entry using thumbs and again to minimize the number of keys on the keyboard, the instant invention also includes a thumb-wheel for control of menus for selection of forms and functions relevant to data input. The thumb-wheel is positioned in close proximity to the keyboard to enable the easily transition from thumb-based typing to thumb control of forms and functions.

In addition to hardware features that encourage optimal data entry through the use of thumbs, there are several software features that are designed to minimize keystrokes and aid in entry of data.

The features of this invention, both individually and collectively, have not, to the knowledge of the inventors, been applied to a small hand-held electronic device that requires user-generated data entry. To permit efficient operation of such devices while keeping the form factor of the device small enough to be worn on the body, there is a general need for a hand-held electronic device that can fit in the palm of the hand and that can be operated substantially with the thumbs.

There is a further need for a keyboard for a palm-size data entry device with keys placed at an angle to optimize operation of the keyboard by the use of the thumbs.

There remains another need for a keyboard with keys that are shaped and sized to maximize contact with the thumbs while minimizing the keyboard area required for such keys.

There also remains a need for an auxiliary input device that is to be operated by the thumb for data inputs forms and function control and that, in conjunction with the keyboard, encourages and permits data entry and management through input performed substantially by the thumbs.

There remains still another need for a software-implemented user interface system that is designed, at least in part, to support and encourage data entry through use of the thumbs.

SUMMARY OF THE INVENTION

The present invention overcomes the problems noted above and satisfies the needs in this field for a hand-held electronic device with a keyboard optimized for use with the thumbs. In the preferred embodiment of the present invention, the hand-held electronic device is a two-way paging device that permits full-text, two-way messaging such as email messaging and that includes standard PDA or PIM features such as an address book, an electronic calendar, a task list and other text-based features. These features require user input of text strings that can be lengthy and that cannot be reduced to pre-determined or "canned" strings. Thus, for such a device, the efficient entry of data in a device meant to fit into the palm of one's hand requires that two goals are achieved. First, the data entry must be relatively easy from a user perspective. This means that the user must be somewhat familiar with analogous forms of data entry and not have to be trained to use the data entry for the hand-held device. Second, the form factor does not permit a large number of keys or keys that are very large. Thus efficient use of the keyboard space is required and functions that might be able to be performed by a standard keyboard are off-loaded to an auxiliary input device or are performed, through a minimal number of keystrokes that encourage the use of thumb-based data entry.

To accomplish these goals, the invention first optimizes the placement of the keys on the device keyboard. In order to work within the limited space available for the keyboard, it was determined that it was preferable to use keys that were oval or oblong and that were placed at angles designed to facilitate use by thumb typing. An angle for the keys on the right side of the keyboard and a complementary angle for the keys on the left side of the keyboard are chosen based upon observation of the angle at which a user will orient his or her thumbs while thumb-typing.

The invention also minimizes the number of keys available for data input. In the preferred embodiment, only keys for the 26 letters of the English alphabet are available as well as a backspace key, a line feed key, an "alt" key, a "cap" key and a space bar. The alt key enables the user in conjunction the other keys to input numbers and symbols to perform certain functions. The placement of the keys is designed to enhance the user experience while typing with the thumbs by meeting two seemingly opposite goals —minimizing the keyboard footprint while maximizing the likelihood that proper keys will be struck by the thumb-typing user.

The invention also provides additional incentive for the user to use thumb input by providing an input device adjacent to the keyboard, but integral to the overall hand-held device. Although other devices can be used in an auxiliary fashion, the preferred device is a thumbwheel that registers movement of the wheel by measuring the number of indents traversed while rolling the wheel and that also registers as an input the depression or "clicking" of the wheel, which is performed by pressing the wheel toward the back of the pager. This clicking of the wheel is similar to the clicking of a mouse associated with a PC or any other input device that registers the depression of a button. The thumbwheel in the preferred embodiment is placed vertically on the two-way paging device so that the user can easily move his or her thumb from the thumbwheel to the keyboard and back for performing functions and retrieving data forms, such as an e-mail template or address book entry template, for data entry.

Additionally, various software techniques can be implemented to enhance the thumb-typing user's experience in using the device of the instant invention. In the preferred embodiment, for example, the user can change the capitalization of a particular letter simply by keeping a key depressed for a particular length of time without an intermittent release being detected by the keyboard controller.

The primary advantage of the present invention is that it enables efficient and user-friendly data entry into a palm-sized electronic device by maximizing the potential for user data entry through thumb typing.

These are just a few of the many advantages of the present invention, as described in more detail below. As will be appreciated, the invention is capable of other and different embodiments and its several details are capable of modifications in various respects, all without departing from the spirit of the invention. Accordingly, the drawings and description of the preferred embodiment set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE INVENTION

Figure 1:
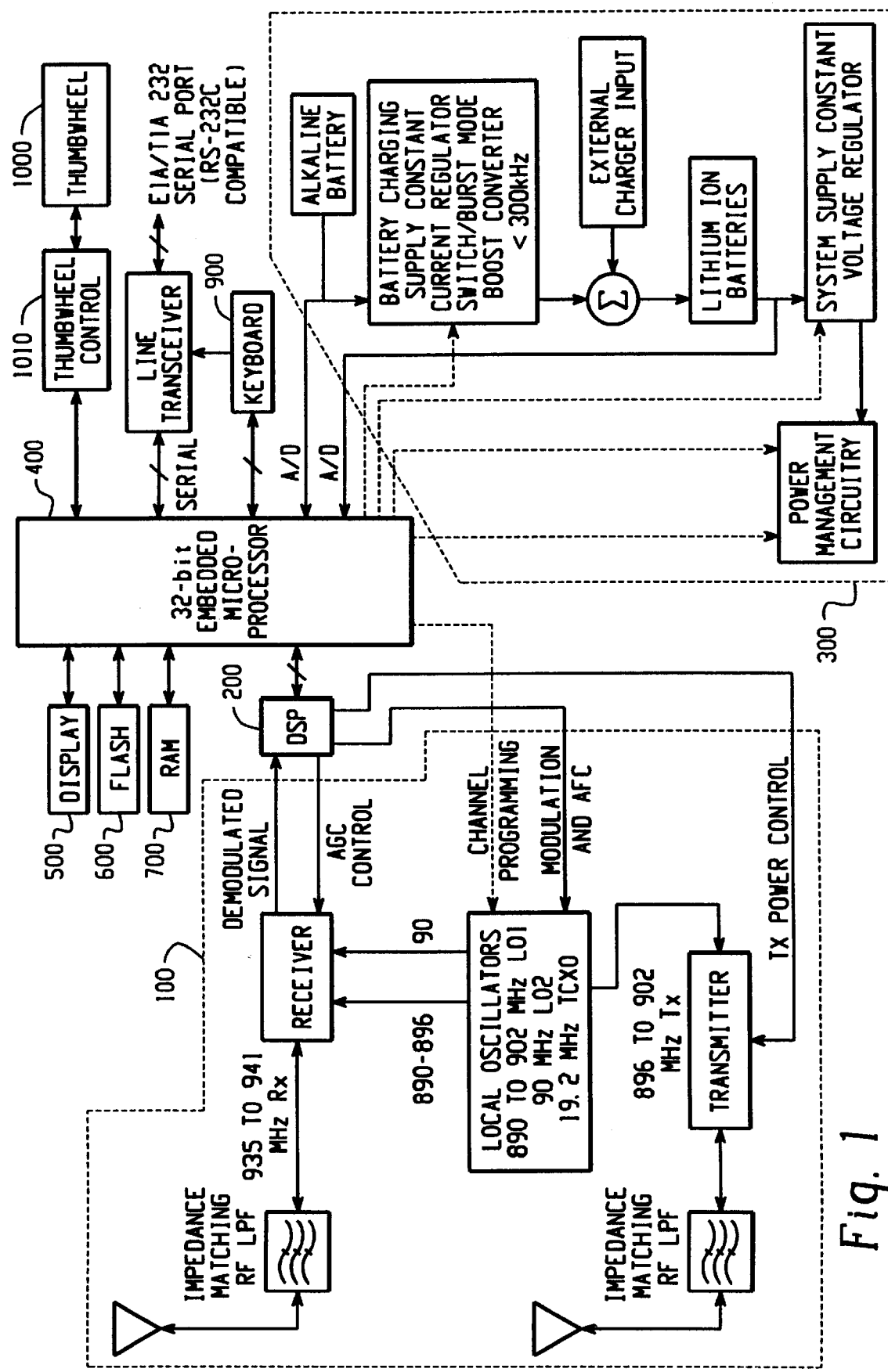
FIG. 1 is a block diagram of a two-way, full-text, messaging device incorporating a keyboard and an auxiliary data entry device.

Referring now to the drawings, FIG. 1 is a block diagram of the major subsystems and elements comprising a palm-sized, mobile, two-way messaging device that preferably incorporates the invention. In its broadest terms, the messaging device includes a transmitter/receiver subsystem 100 connected to a DSP 200 for digital signal processing of the incoming and outgoing data transmissions, power supply and management subsystem 300, which supplies and manages power to the overall messaging device components, microprocessor 400, which is preferably an X86 architecture processor, that controls the operation of the messaging device, display 500, which is preferably a full graphic LCD, FLASH memory 600, RAM 700, serial output and port 800, keyboard 900, thumbwheel 1000 and thumbwheel control logic 1010. In its intended use, a message comes via a wireless data network, such as the Mobitex network, into subsystem 100, where it is demodulated via DSP 200 and decoded and presented to microprocessor 300 for display on display 500. To access the display of the message, the user may choose from functions listed under a menu presented as a result of user interaction with thumbwheel 1000. If the message is an email message, the user may chose to respond to the email by selecting "Reply" from a menu presented on the display through interaction via thumbwheel 1000 or via menu selection from keyboard 900. In typing the reply, the user can use keyboard 900 to type full text message replies, or insert pre-determined or "canned" response by using either a particular keystroke pattern or through pulling down pre-determined text strings from a menu of items presented on display 500 through the use of thumbwheel 1000. When the reply to the message is composed, the user can initiate the sending of the message preferably by interaction through thumbwheel 1000, or alternatively, with less efficiency. through a combination of key board 900 keystrokes. When the microprocessor 300 receives an indication that the message is to be sent, it processes the message for transport and, by directing and communicating with transmitter/receiver subsystem 100, enables the reply message to be sent via the wireless communications data network to the intended recipient. Similar interaction through I/O devices keyboard 900 and thumbwheel 1000 can be used to initiate full-text messages or to forward messages to another party. Also, the keyboard 900 and thumbwheel 1000 can be used to permit data entry to an address book resident on the messaging device, or an electronic calendar or log book, or any other function on the messaging device requiring data entry. Preferably, the thumbwheel is a thumbwheel with a push button SPST with quadrature signal outputs, such as that manufactured by Matsushita Electronic Components Co. Ltd. as part number EVQWK2001.

Figure 2:
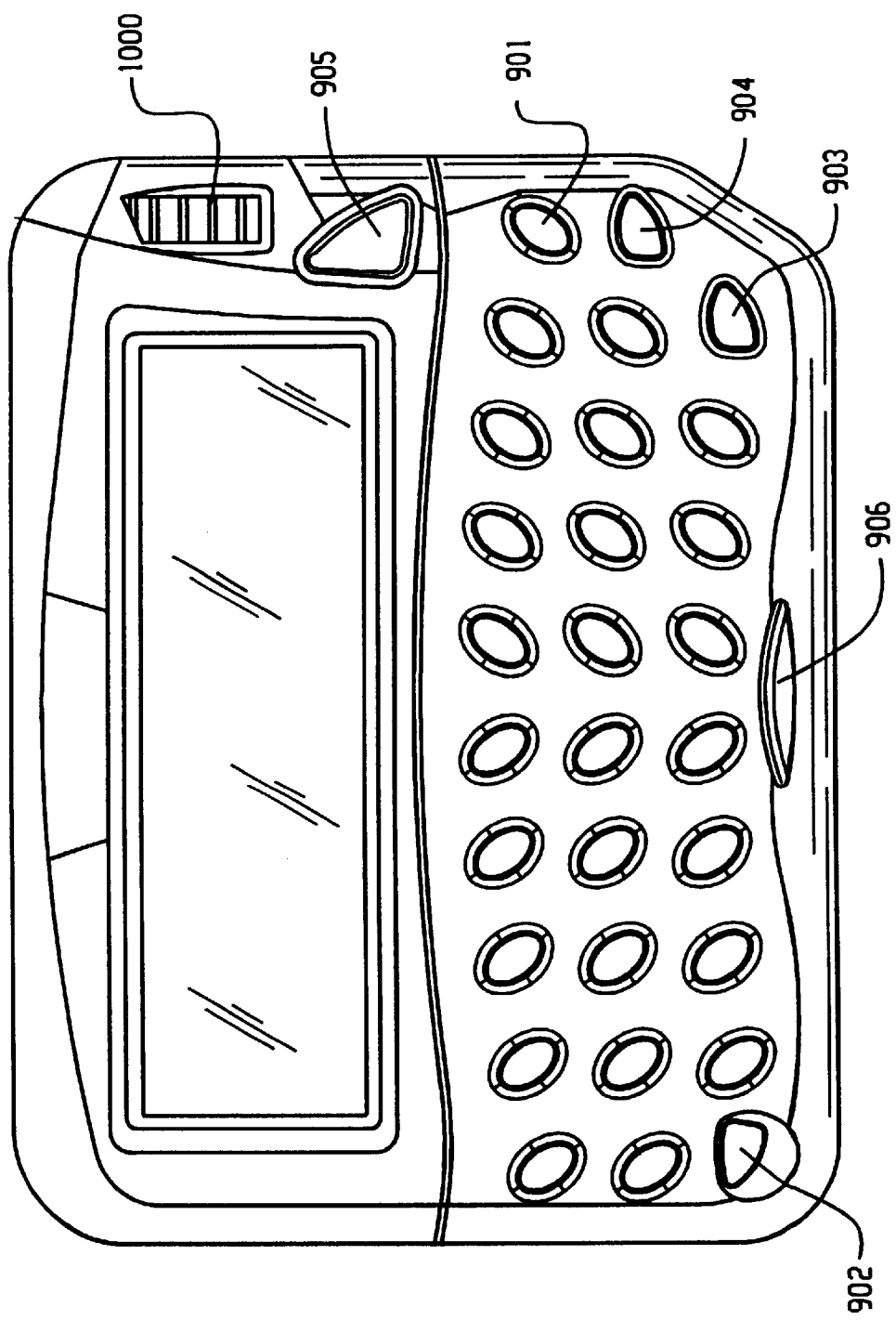
FIG. 2 is a frontal view of the hand-held device showing the shape and placement of the keys on the keyboard and the auxiliary input device.

FIG. 2 is a front view of messaging device 10 that incorporates the invention. Shown in FIG. 2 are a plurality of letter keys 901, and specialized keys 902, 903, 904 and 905 and space bar 906. Also shown is thumbwheel 1000 in its vertical orientation and in association with display 500 and keyboard 900. In the preferred embodiment, 902 is the alt key, 903 is the cap key, 904 is the line feed key and 905 is the backspace key.

Figure 3:
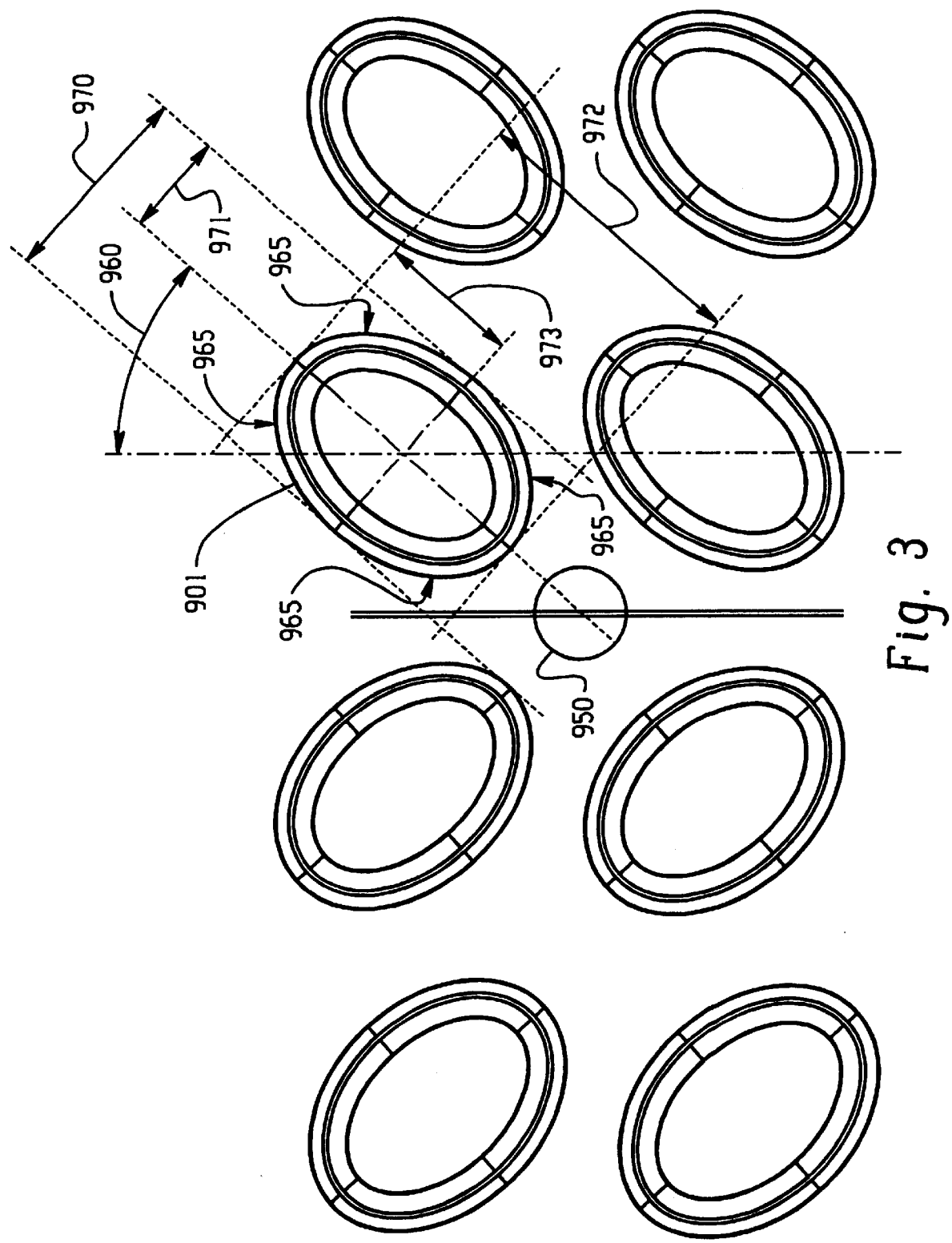
FIG. 3 is a diagram of showing the shape, size and placement of the keys on the keyboard.

FIG. 3 is a view of a subset of the letter keys 901, showing the dimensions and relative position of the keys. Shown also is the point 950 that marks the center of keyboard 900, key dimensions 970, 971, 972 and 973, as well as angle 960 and the rho value 965, representing curvature of a letter key 901. In investigating optimal key placement on the keyboard, it was determined that the keys should be placed at an angle 960 relative to vertical that facilitated easy typing using thumbs. That angle is preferably positive 40 degrees relative to vertical for keys on the right side of the keyboard (where 950 is the center of the keyboard) and negative 40 degrees for the keys on the left side of the keyboard, although complementary angles ranging from 20 degrees to 70 degrees could also be used to accomplish the goal, albeit less optimally, of facilitating thumb typing. Also as shown on FIGS. 2 and 3, the keys are dispersed across keyboard 900 evenly so that there is sufficient space between the keys to decrease the opportunity for multiple keys being depressed while thumb typing. Additionally, the keys are sized appropriately given the footprint of the messaging device and the keyboard 900. In its preferred embodiment, the messaging device 10 measures across its face 64 mm by 89mm, which does not leave much room for keyboard 900 and display 500. In the preferred embodiment, keyboard 900 occupies over half of the face of the messaging device 10.

The key shape and dimensions are also key components of the invention. In order to maximize the surface area of the key that a thumb would hit, the keys are preferably oval, and have a rho 965 defining the curvature of the key of 414, although values may range higher or lower. Other rho values will lead to an acceptable, but not as optimal or aesthetically pleasing shape of keys 901. As to the key dimensions, the width 970 of the key 901 is 4.8 millimeters (971 representing the radius of half that value, 2.4 mm) and the length (or height) 972 of the key 901 is 7 millimeters millimeters (973 representing the radius of half that value, 3.5 mm).

Turning to one of the software features that aids in the device 10 being optimally used for thumb typing is a capitalization feature implemented via software. If a user depresses a key 901, the operating system detects a key down event. If the key is released after a period of time, the operating system detects a key up event. If upon a key down event, a period of time elapses before a key up event is detected, the operating system determines that a key repeat event has occurred representing a situation where a user has continued to depress a key without releasing it. A key repeat event is then treated by application software residing in either FLASH 600 or RAM 700 as an event that requires the capitalization of the key previously depressed. This feature disables a key repeat feature and substitutes instead a capitalization feature based upon a key repeat. The timing of the key scanning to determine whether a key has been released can be set to permit a slower keyboard response or a faster keyboard response, depending upon user experience or preferences. Although the capitalization function preferably works only to change the state of a letter to a capital, it alternatively could operate to change a capital letter to a lower case letter. The actual display is changed by the application program substituting the value of the capital letter in the register that holds the value of the letter to be displayed. As alternatively implemented, the continued depressing without release of a letter key could result in a key oscillating between upper case and lower case, depending on the length of time the key is depressed.

Figure 4:
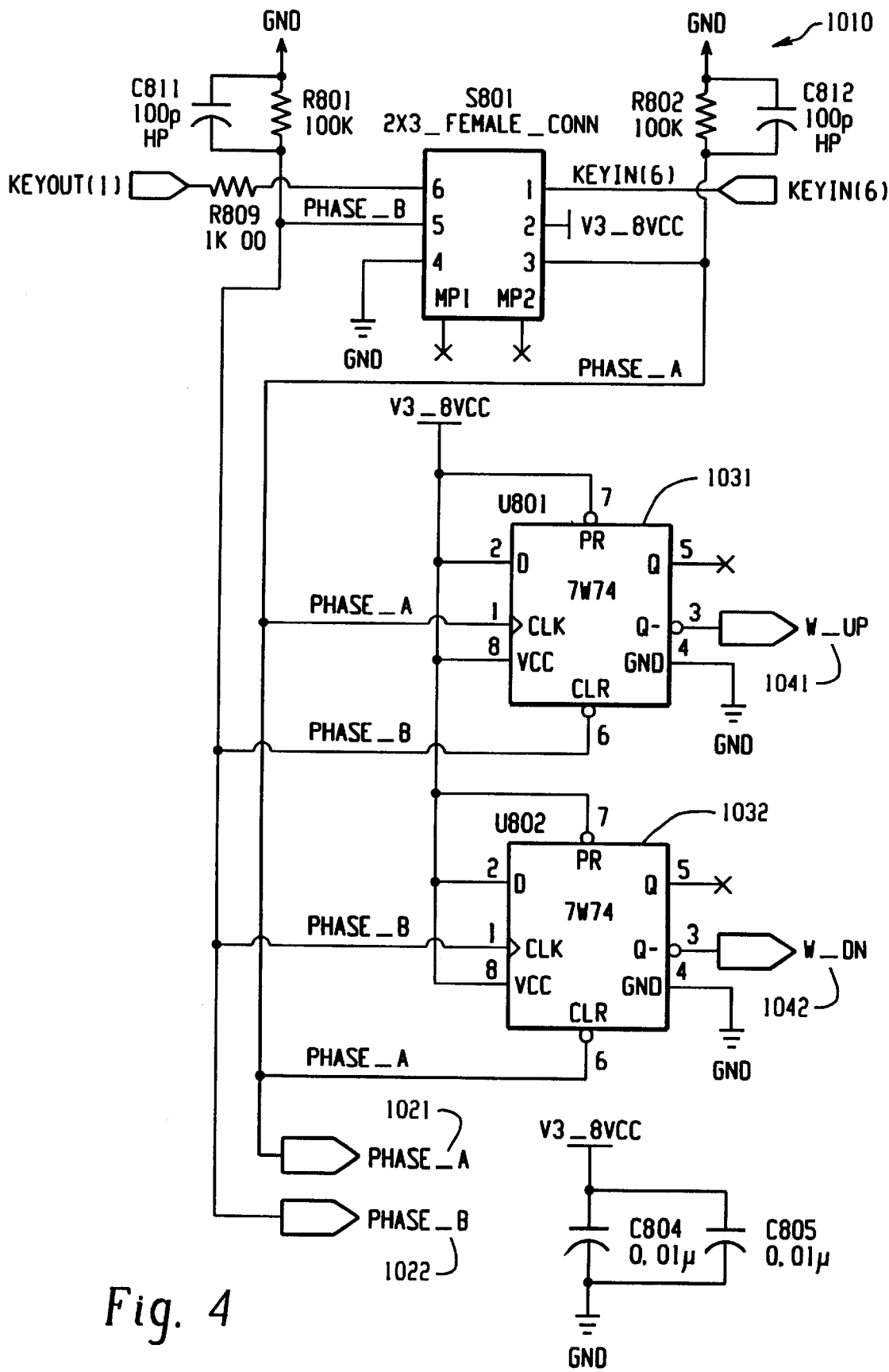
FIG. 4 is a diagram of the control circuitry for the thumbwheel.

FIG. 4 is the logic circuitry 1010 associated with thumbwheel 1000. Thumbwheel 1000 outputs quadrature signals phase A 1021 and phase B 1022, which are processed by D flip-flops 1031 and 1032 to present signals 1041 $W_{13}UP$ and 1042 $W_{13}DN$ to microprocessor 300. Signals 1041 and 1042 represent, respectively, a user rolling the thumbwheel up and rolling the thumbwheel down.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

What is claimed:

1. A method in a mobile communication device having a wireless transceiver, a display, a QWERTY-style keyboard, and an auxiliary input device, the method comprising the steps of:

receiving a plurality of e-mail messages with the wireless transceiver, the plurality of e-mail messages being transmitted from a wireless network;

displaying a list of the plurality of received e-mail messages on the display;

selecting and accessing one of the plurality of received e-mail messages by moving the auxiliary input device in a direction that corresponds to a desired direction on the displayed list and by depressing the auxiliary input device to select and access a particular received e-mail message;

displaying the selected message on the display;

activating a menu of e-mail commands and displaying the menu of commands on the display;

selecting and executing one of the e-mail commands on the menu by moving the auxiliary input device in a direction that corresponds to a desired direction on the displayed menu and by depressing the auxiliary input device to select and execute a particular e-mail command, wherein one of the e-mail commands is a command to generate a reply message to the displayed message;

if the command to generate a reply message is selected and executed, then (a) displaying a reply e-mail message form on the display; (b) inputting reply message text using the QWERTY-style keyboard; and (c) selecting and executing a send e-mail command from a menu of commands displayed on the display using the auxiliary input device to transmit the reply message from the mobile communications device to the wireless network using the wireless transceiver.

2. The method of claim 1, wherein the mobile communication device further comprises a microprocessor coupled to a memory for storing an operating system that is executed by the microprocessor, the operating system enabling the steps of:

displaying a first character on the display when a key is selected using the QWERTY-style keyboard; and displaying a second character on the display in place of the first character when the key is continually depressed for a predetermined period of time.

3. The method of claim 2, wherein the first character is a lower case character and the second character is an upper case character.

4. The method of claim 2, wherein the predetermined period of time can be modified by a user of the electronic device.

5. The method of claim 1, wherein the QWERTY-style keyboard includes a plurality of oblong shaped letter keys.

6. The method of claim 5, wherein the plurality of oblong shaped letter keys are oval shaped keys.

7. The method of claim 1, wherein the mobile communication device is a two-way pager, a personal digital assistant, or a cellular telephone.

8. The method of claim 1, wherein the auxiliary input device is a thumbwheel.

9. The method of claim 1, further comprising the steps of:

storing a plurality of application programs in a memory of the mobile communication device;

displaying a list of the plurality of application programs on the display;

selecting and executing one of the plurality of application programs by moving the auxiliary input device in a direction that corresponds to a desired direction on the displayed list and by depressing the auxiliary input device to select and execute a particular one of the plurality of application programs.

10. The method of claim 9, wherein the plurality of application programs include an e-mail application and a calendar application.

11. The method of claim 10, wherein the plurality of application programs further include an address book application.

12. An electronic wireless messaging device, comprising;

a microprocessor;

a transceiver coupled to the microprocessor for sending and receiving electronic messages via a wireless network;

a display coupled to the microprocessor for displaying a list of received electronic messages from the wireless network and for displaying a menu of electronic message processing commands;

a QWERTY-style keyboard coupled to the microprocessor for inputting electronic messages; and an auxiliary input device for selecting and accessing one of the received electronic messages displayed on the list of received electronic messages by moving the auxiliary input device in a direction that corresponds to a desired direction on the displayed list and by depressing the auxiliary input device to select and access a particular received electronic message;

wherein the auxiliary input device is also for selecting and executing one of the electronic message processing commands on the menu by moving the auxiliary input device in a direction that corresponds to a desired direction on the displayed menu and by depressing the auxiliary input device to select and execute a particular electronic message processing command.

13. The electronic wireless messaging device of claim 12, wherein one of the electronic message processing commands is a generate reply message command, which when accessed and executed by the auxiliary input device causes the electronic messaging device to display a reply electronic message form, wherein a user of the electronic messaging device inputs reply message text using the keyboard into the reply electronic message form, and then selects and executes a send electronic message command from the menu of electronic message processing commands to transmit the reply message from the electronic wireless messaging device to the wireless network using the transceiver.

14. The electronic wireless messaging device of claim 12, wherein the QWERTY-style keyboard comprises a plurality of oblong shaped keys.

15. The electronic wireless messaging device of claim 14, wherein the plurality of oblong shaped keys are oval shaped.

16. The electronic wireless messaging device of claim 14, wherein the plurality of oblong shaped keys are tilted at an angle with respect to a vertical reference line through the electronic wireless messaging device.

17. The electronic wireless messaging device of claim 16, wherein the plurality of oblong shaped keys comprise a first set of oblong shaped keys and a second set of oblong shaped keys, wherein the first set of oblong shaped keys are tilted at a positive angle with respect to the vertical reference line and the second set of oblong shaped keys are tilted at a negative angle with respect to the vertical reference line.

18. The electronic wireless messaging device of claim 12, further comprising a memory coupled to the microprocessor for storing an operating system that is executed by the microprocessor, the operating system enabling the steps of:

displaying a first character on the display when a key is selected using the QWERTY-style keyboard; and displaying a second character on the display in place of the first character when the key is continually depressed for a predetermined period of time.

19. The electronic wireless messaging device of claim 18, wherein the first character is a lower case character and the second character is an upper case character.

20. The electronic wireless messaging device of claim 18, wherein the predetermined period of time can be modified by a user of the electronic device.

21. The electronic wireless messaging device of claim 12, wherein the electronic wireless messaging device is a two-way pager, a personal digital assistant, or a cellular telephone.

22. The electronic wireless messaging device of claim 12, wherein the auxiliary input device is a thumbwheel.

23. The electronic wireless messaging device of claim 12, further comprising:

a memory for storing a plurality of application programs;

wherein the display displays a list of the plurality of application programs, and wherein the auxiliary input device is used to select and execute one of the plurality of application programs by moving the auxiliary input device in a direction that corresponds to a desired direction on the displayed list and by depressing the auxiliary input device to select and execute a particular one of the plurality of application programs.

24. The electronic wireless messaging device of claim 23, wherein the plurality of application programs include an e-mail application and a calendar application.

25. The electronic wireless messaging device of claim 24, wherein the plurality of application programs further include an address book application.

* * * * *